United States Patent
Ma et al.

(10) Patent No.: US 12,264,915 B2
(45) Date of Patent: Apr. 1, 2025

(54) MEMS GYROSCOPE

(71) Applicant: AAC Kaitai Technologies (Wuhan) CO., LTD, Hubei (CN)

(72) Inventors: Zhao Ma, Shenzhen (CN); Zhan Zhan, Shenzhen (CN); Shan Yang, Shenzhen (CN); Xiao Kan, Shenzhen (CN); Shitao Yan, Shenzhen (CN); Yang Li, Shenzhen (CN); Hongtao Peng, Shenzhen (CN); Kahkeen Lai, Singapore (SG); Veronica Tan, Singapore (SG); Yan Hong, Shenzhen (CN)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 279 days.

(21) Appl. No.: 17/873,195

(22) Filed: Jul. 26, 2022

(65) Prior Publication Data

US 2023/0228569 A1    Jul. 20, 2023

(30) Foreign Application Priority Data

Jan. 19, 2022   (CN) .......................... 202210061281.6

(51) Int. Cl.
*G01C 19/5712*   (2012.01)
(52) U.S. Cl.
CPC ................ *G01C 19/5712* (2013.01)
(58) Field of Classification Search
CPC ............ G01C 19/5712; G01C 19/5747; G01C 19/5621
See application file for complete search history.

(56) References Cited

U.S. PATENT DOCUMENTS

| | | | | |
|---|---|---|---|---|
| 2005/0050954 | A1* | 3/2005 | Chaumet | G01C 19/5747 73/504.12 |
| 2010/0218605 | A1* | 9/2010 | Blomqvist | G01C 19/5747 73/504.12 |
| 2016/0265916 | A1* | 9/2016 | Kergueris | G01C 19/5621 |
| 2017/0234684 | A1* | 8/2017 | Coronato | G01C 19/5747 73/504.12 |
| 2018/0238689 | A1* | 8/2018 | Ruohio | G01P 15/125 |
| 2018/0245920 | A1* | 8/2018 | Laghi | G01C 19/5712 |
| 2018/0283867 | A1* | 10/2018 | Ruohio | G01C 19/5747 |
| 2019/0017823 | A1* | 1/2019 | Shao | G01C 19/5769 |
| 2020/0124418 | A1* | 4/2020 | Blomqvist | G01P 15/02 |
| 2020/0208975 | A1* | 7/2020 | Coronato | G01C 19/5747 |

(Continued)

*Primary Examiner* — David J Bolduc
(74) *Attorney, Agent, or Firm* — W&G Law Group

(57) ABSTRACT

The invention discloses a MEMS gyroscope, including a substrate, a first unit and a second unit, and the first unit and the second unit are relatively arranged on the substrate along the first direction. The first unit is connected to the second unit through a coupling spring, and the substrate is also provided with a driving electrode and a detection electrode. The first unit includes a first weight and a second weight. The second unit includes the third weight and the fourth weight set oppositely along the second direction. The second set of coupling structures are connected to the third weight and fourth weight. Compared with the prior art, the beneficial effect of the present invention is that the MEMS gyroscope adopts a symmetrical layout, which facilitates the realization of differential detection and improves the sensitivity.

10 Claims, 1 Drawing Sheet

(56) References Cited

U.S. PATENT DOCUMENTS

| | | | | |
|---|---|---|---|---|
| 2021/0372794 A1* | 12/2021 | Blomqvist | ............ | G01C 19/574 |
| 2022/0228864 A1* | 7/2022 | Reinmuth | ........... | G01C 19/5719 |
| 2022/0373331 A1* | 11/2022 | Ma | ..................... | G01C 19/5649 |
| 2023/0266122 A1* | 8/2023 | Ma | ..................... | G01C 19/5712 |
| | | | | 73/504.12 |
| 2024/0060778 A1* | 2/2024 | Zhan | .................. | G01C 19/5747 |

* cited by examiner

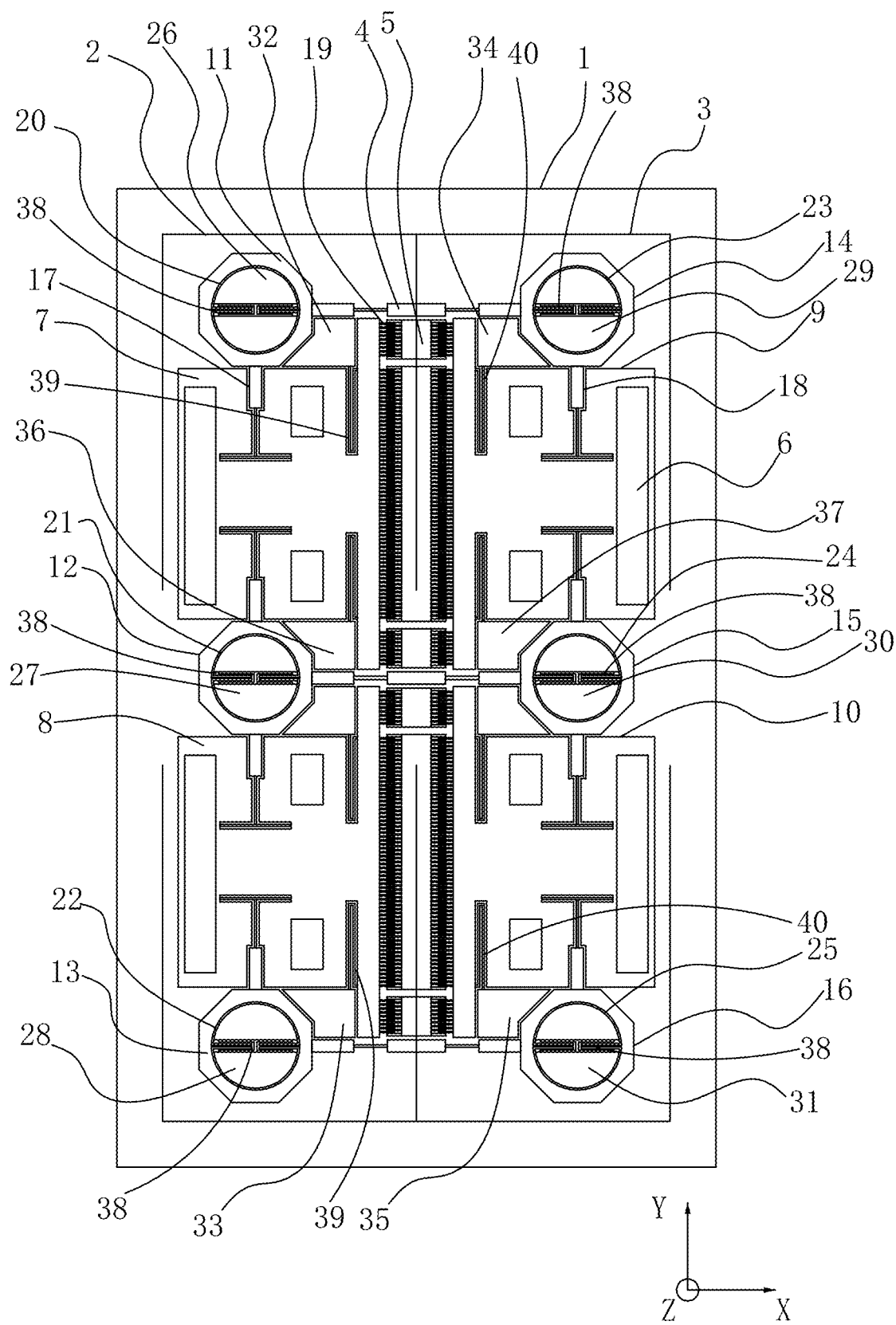

MEMS GYROSCOPE

FIELD OF THE PRESENT DISCLOSURE

The present invention relates to of gyroscopes, in particular to a MEMS gyroscope.

DESCRIPTION OF RELATED ART

An micromachined gyroscope, namely MEMS (Micro Electro Mechanical systems) gyroscope, is a typical microsensor with miniature angular velocity, which is widely used in the consumer electronics market due to its advantages of small size, low power consumption and convenient processing. In recent years, with the gradual improvement of gyroscope performance, it is widely used in automotive, industrial, virtual reality and other fields.

The MEMS out-of-plane swing gyroscope is a typical representative of the MEMS out-of-plane detection gyroscope. The drive mode of the MEMS out-of-plane swing gyroscope in the related art swings about the axis of the anchor point. When an angular velocity $\Omega$ is applied, the gyroscope transfers energy to the detection mode due to the Coriolis effect, causing the weight structure to oscillate out-of-plane in relative drive. The size of $\Omega$ can be obtained by detecting the displacement of the out-of-plane swing. However, the detection capacitor of this MEMS out-of-plane swing gyroscope is small and has low sensitivity.

SUMMARY OF THE PRESENT INVENTION

The main purpose of the present invention is to provide a MEMS gyroscope to increase the sensitivity thereof.

Accordingly, the present invention provides a MEMS gyroscope, comprising: a substrate; a first unit and a second unit arranged on the substrate along a first direction, the first unit being connected with the second unit through a coupling spring; a driving electrode and a plurality of detection electrodes formed on the substrate. Wherein the first unit includes a first weight and a second weight arranged along a second direction perpendicular to the first direction; the second unit includes a third weight and a fourth weight disposed oppositely along the second direction. The MEMS gyroscope further includes a first set of coupling structures disposed on opposite sides of the first weight and the second weight along the second direction; the first set of coupling structures is connected with the first weight and the second weight through the first set of elastic beams.

The MEMS gyroscope further includes a second set of coupling structures disposed on opposite sides of the third weight and the fourth weight along the second direction; the second set of coupling structures is connected with the third weight and the fourth weight through the second set of elastic beams; the coupling structures in the first set of coupling structures and the second set of coupling structures opposite along the first direction are connected by the coupling spring.

As an option to improve the invention mentioned above, the first set of coupling structures includes a first coupling structure arranged on the side of the first weight away from the second weight, a second coupling structure arranged between the first weight and the second weight; the third coupling structure on the side of the second weight away from the first weight; the first coupling structure, the second coupling structure and the third coupling structure are connected with the first weight and/or the second weight through the first set of elastic beams. The second set of coupling structures includes a fourth coupling structure disposed on the side of the third weight away from the fourth weight, a fifth coupling structure disposed between the third weight and the fourth weight, a sixth coupling structure on the side of the fourth weight away from the third weight; the fourth coupling structure. The fifth coupling structure and the sixth coupling structure are connected with the third weight and/or the fourth weight through the second set of elastic beams; the first coupling structure and the fourth coupling structure, the second coupling structure and the fifth coupling structure, and the third coupling structure and the sixth coupling structure are all connected by the coupling spring.

As an option to improve the invention mentioned above, the driving electrode is arranged between the first unit and the second unit, the first weight, the inner sides of the first weight, the second weight, the third weight, and the fourth weight are all provided with active driving interdigital; the active driving interdigital and the fixed driving interdigital on the driving electrode form a driving capacitor.

As an option to improve the invention mentioned above, the plurality of detection electrodes correspond to the outer sides of the first unit and the second unit along the first direction, is respectively engaged with the first weight, the second weight, the third weight, and the fourth weight for forming a detection capacitor.

As an option to improve the invention mentioned above, the MEMS gyroscope further includes several anchor structures fixed on the substrate, a first slot through the first coupling structure, a second slot through the second coupling structure, and a third slot through the third coupling structure. The anchor structure includes a first anchor point, a second anchor point and a third anchor point respectively set in the first slot, the second slot and the third slot. The MEMS gyroscope is fixed on the substrate through the first anchor point, the second anchor point and the third anchor point. The MEMS gyroscope further includes a fourth slot through the fourth coupling structure, a fifth slot through the fifth coupling structure, and a sixth slot through the sixth coupling structure; the plurality of anchor structures further include a fourth anchor point, a fifth anchor point and a sixth anchor point respectively set in the fourth slot, the fifth slot and the sixth slot; the second unit of the MEMS gyroscope is fixed to the substrate through the fourth anchor point, the fifth anchor point and the sixth anchor point.

As an option to improve the invention mentioned above, the several anchor structures are respectively connected to the coupling structure where they are located through at least one elastic beam.

As an option to improve the invention mentioned above, the anchor structure further includes a seventh anchor point arranged on the side of the first weight away from the second weight and fixed on the substrate, an eighth anchor point arranged on the side of the second weight away from the first weight and fixed on the substrate; the seventh anchor point and the eighth anchor point are respectively connected to the first weight or the second weight through an elastic beam.

As an option to improve the invention mentioned above, the anchor structure further includes a ninth anchor point arranged on the side of the third weight away from the fourth weight and fixed on the substrate, a tenth anchor point arranged on the side of the fourth weight away from the third weight and fixed on the substrate; the ninth anchor point and the tenth anchor point are respectively connected with the third weight or the fourth weight through an elastic beam.

As an option to improve the invention mentioned above, the first unit further includes a first fixed component connected to the first weight and/or the second weight and fixed to the substrate, which is provided between the first weight and the second weight; the second unit further includes a second fixed component connected to the third weight and/or the fourth weight and fixed to the substrate, which is provided between the third weight and the fourth weight.

As an option to improve the invention mentioned above, the MEMS gyroscope is a symmetrical structure along the first direction and/or the second direction.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

FIG. 1 is a structural diagram of a MEMS gyroscope in accordance with an exemplary embodiment of the present invention.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Referring to FIG. 1, the positive direction of X axle that defines the three-dimensional coordinate system with the center point of substrate 1 as the origin points to the right, the positive direction of Y axle points to the upper side, and the positive direction of Z axle points to the outer side of the X and Y planes.

As shown in FIG. 1, the embodiment of the present invention provides a MEMS gyroscope, which includes a substrate 1, first unit 2 and second unit 3, and first unit 2 and second unit 3 are relatively arranged on substrate 1 along the first direction. In this embodiment, the first direction is defined as the X Axis direction, and the first unit 2 and second unit 3 adopt a symmetrical layout. It can effectively suppress all kinds of common mode interference signals, which is convenient for differential detection. The first unit 2 and the second unit 3 are connected through elastic connection components such as coupling spring 4. A driving electrode 5 and a detection electrode 6 are also provided on the substrate 1. In some embodiments, the driving electrode 5 is arranged symmetrically between the first unit 2 and the second unit 3. The detection electrode 6 is symmetrically arranged on the outer side of first unit 2 and second unit 3 (that is, the side away from each other) and corresponds to first unit 2 and second unit 3, wherein:

The first unit 2 includes a first weight 7 and a second weight 8 that are relatively set along the second direction. In this embodiment, the second direction is defined as the Y axis direction. The MEMS gyroscope also includes a first set of coupling structures that are set on opposite sides of the first weight 7 and second weight 8 along the second direction. The first set of coupling structures is connected with the first weight 7 and second weight 8 through the first set of elastic beams 17. In order to realize the movement of the first weight 7 and the second weight 8 on the X axis direction and the swing with the Y axis direction as the axis direction.

The second unit 3 includes a third weight 9 and a fourth weight 10 disposed oppositely along the second direction, and the MEMS gyroscope also includes a second set of coupling structures disposed on opposite sides of the third weight 9 and the fourth weight 10 along the second direction. The second set of coupling structures is connected with the third weight 9 and fourth weight 10 through the second set of elastic beams 18. The coupling structures of the first set of coupling structures and the second set of coupling structures opposite along the first direction are connected by coupling spring 4. In order to realize the movement of the third weight 9 and the fourth weight 10 on X axis direction and the torsion with Y axle as the axis. Wherein, the first weight 7 and the third weight 9 are oppositely set along the X axis direction, and the second weight 8 and the fourth weight 10 are oppositely set along the X axis direction. Preferably, the structures and sizes of the first weight 7, the second weight 8, the third weight 9 and the fourth weight 10 are the same.

The MEMS gyroscope provided by the present invention is a symmetrical structure along the first direction and/or the second direction. Preferably, the structure of the MEMS gyroscope involved in this embodiment is a symmetrical structure that is completely symmetrical along X axle and Y axle.

The MEMS gyroscope provided by this embodiment is arranged with at least two modes: Drive mode (weight horizontal translation) and detection mode (weight out-of-plane swing mode):

The driving mode is that the first weight 7 and third weight 9 move in opposite directions along X axle at the same time, and the second weight 8 and fourth weight 10 move in opposite directions along X axis direction at the same time. The principle is: When alternating current is applied to the driving electrode 5, and direct current is applied to the weight, when the alternating current is positive, a repulsive force is generated between the driving electrode 5 and the weight, and when the alternating current is negative, an attractive force is generated between the driving electrode 5 and the weight. Therefore, when alternating current is applied to the driving electrode 5 and direct current is applied to the weight, the first weight 7 and the third weight 9 will move in opposite directions along the X axis direction at the same time, and the second weight 8 and the fourth weight 10 will move in the opposite direction along the X axis direction at the same time.

In the driving mode, since the first weight 7, second weight 8, third weight 9 and fourth weight 10 adopt a symmetrical differential design, the two movement directions of the weight are opposite to each other, which is a differential driving, which can effectively improve the stability of the gyroscope drive, improve the quality factor and mechanical sensitivity of the gyroscope.

The gyroscope is driven to vibrate in the driving mode type by an external driving force. At this time, when the gyroscope is subjected to the Y axle angular velocity ω, according to the Coriolis principle, the angular velocity ω will generate the Coriolis force along the Z Axis direction, and the Coriolis force will force the gyroscope to generate vibrations with the Y axle detection mode type. Finally, by detecting the vibration displacement of the gyroscope along the Z Axis direction, the magnitude of the angular velocity ω can be obtained.

Further, the driving electrode 5 is symmetrically arranged between the first unit 2 and the second unit 3, the inner sides of the first weight 7, the second weight 8, the third weight 9, and fourth weight 10 are all arranged with a active driving interdigital 19, the active driving interdigital 19 and the fixed driving interdigital on the driving electrode 5 form a driving capacitor. The driving capacitor receives the driving signal provided by the peripheral circuit and generates the external driving force required to drive the gyroscope to vibrate in the driving mode type.

Further, a plurality of detection electrodes 6 correspond to the outer sides of the first unit 2 and the second unit 3 along the first direction and are spaced apart from the first weight 7, the second weight 8, the third weight 9, and the fourth weight 10 to form a detection capacitor. The detection capacitor detects the vibration displacement of the gyroscope along the vibration direction of the detection mode to obtain the angular velocity ω.

Further, the first set of coupling structures includes a first coupling structure 11 arranged on the side of the first weight 7 away from the second weight 8, a second coupling structure 12 arranged between the first weight 7 and the second weight 8, and a third coupling structure 13 disposed on the side of the second weight 8 away from the first weight 7. The first coupling structure 11, the second coupling structure 12 and the third coupling structure 13 are connected with the first weight 7 and/or the second weight 8 through a first set of elastic beams 17. Specifically, the first coupling structure 11 is connected with the first weight 7, the second coupling structure 12 is connected with the first weight 7 and the second weight 8 respectively, and the third coupling structure 13 is connected with the second weight 8.

The second set of coupling structures includes a fourth coupling structure 14 arranged on the side of the third weight 9 away from the fourth weight 10, a fifth coupling structure 15 arranged between the third weight 9 and the fourth weight 10, and a sixth coupling structure 16 disposed on the side of the fourth weight 10 away from the third weight 9. The fourth coupling structure 14, the fifth coupling structure 15 and the sixth coupling structure 16 are connected with the third weight 9 and/or the fourth weight 10 through a second set of elastic beams 18. Specifically, the fourth coupling structure 14 is connected with the third weight 9, the fifth coupling structure 15 is connected with the third weight 9 and the fourth weight 10, respectively, and the sixth coupling structure 16 is connected with the fourth weight 10.

The first coupling structure 11 and the fourth coupling structure 14, the second coupling structure 12 and the fifth coupling structure 15, the third coupling structure 13 and the sixth coupling structure 16 are symmetrically arranged along the Y axis direction, and are connected to each other by the coupling spring 4. Preferably, the structures and dimensions of the first coupling structure 11, the second coupling structure 12, the third coupling structure 13, the fourth coupling structure 14, the fifth coupling structure 15 and the sixth coupling structure 16 are the same. In some embodiments, the cross sections of the first coupling structure 11, the second coupling structure 12, the third coupling structure 13, the fourth coupling structure 14, the fifth coupling structure 15 and the sixth coupling structure 16 along the X, Y plane are regular octahedrons. Those skilled in the art can know that, the structures of the first coupling structure 11, the second coupling structure 12, the third coupling structure 13, the fourth coupling structure 14, the fifth coupling structure 15 and the sixth coupling structure 16 may be other regular or irregular patterns, which are not limited herein.

The MEMS gyroscope also includes several anchor structures fixed on the substrate 1, the several anchor structures include a first anchor point 26, a second anchor point 27 and a third anchor point 28, the first coupling structure 11 runs through a first slot 20, and a first anchor point 26 is set in the first slot 20. In some embodiments, the projection of the first anchor point 26 on Z axle falls within the first slot 20, and the first anchor point 26 is connected to the first coupling structure 11 where it is located through a third elastic beam 38. The first slot 20 is preferably a round slot, and one end of the third elastic beam 38 is connected to the first anchor point 26. The other end is connected to the inner wall of the first slot 20. A second slot 21 runs through the second coupling structure 12, and the second anchor point 27 is arranged in the second slot 21. In some embodiments, the projection of second anchor point 27 on Z axle falls within second slot 21. The second anchor point 27 is connected to the second coupling structure 12 through a third elastic beam 38, and one end of the third elastic beam 38 is connected to the second anchor point 27. The other end is connected to the inner wall of second slot 21. A third slot 22 runs through the third coupling structure 13, and the third anchor point 28 is arranged in the third slot 22. In some embodiments, the projection of the third anchor point 28 on Z axle falls within the third slot 22. The third anchor point 28 is connected to the third coupling structure 13 through a third elastic beam 38, and one end of the third elastic beam 38 is connected to the third anchor point 28. The other end is connected to the inner wall of the third slot 22.

The plurality of anchor structures further includes a fourth anchor point 29, a fifth anchor point 30 and a sixth anchor point 31, a fourth slot 23 arranged penetrates through the fourth coupling structure 14, and a fourth anchor point 29 is disposed in the fourth slot 23. In some embodiments, the projection of the fourth anchor point 29 on Z axle falls within the fourth slot 23. The fourth anchor point 29 is connected to the fourth coupling structure 14 through a third elastic beam 38. One end of the third elastic beam 38 is connected to the fourth anchor point 29, and the other end is connected to the inner wall of the fourth slot 23. A fifth slot 24 runs through the fifth coupling structure 15, and the fifth anchor point 30 is set in the fifth slot 24. In some embodiments, the projection of the fifth anchor point 30 on Z axle falls within the fifth slot 24, and the fifth anchor point 30 is connected to the fifth coupling structure 15 through a third elastic beam 38. One end of the elastic third elastic beam 38 is connected to the fifth anchor point 30, and the other end is connected to the inner wall of fifth slot 24. The sixth coupling structure 16 is arranged with a sixth slot 25 running through it, and the sixth anchor point 31 is set in the sixth slot 25. In some embodiments, the projection of sixth anchor point 31 on Z axle falls within sixth slot 25. The sixth anchor point 31 is connected to the sixth coupling structure 16 through a third elastic beam 38, one end of the elastic beam 38 is connected to the sixth anchor point 31, and the other end is connected to the inner wall of the sixth slot 25.

The anchor structure also includes a seventh anchor point 32 and an eighth anchor point 33. the seventh anchor point 32 is set on the side of the first weight 7 away from the second weight 8, and the first weight 7 is connected to the seventh anchor point 32 through a fourth elastic beam 39. The eighth anchor point 33 is set on the side of the second weight 8 away from the first weight 7, and the second weight 8 is connected to the eighth anchor point 33 through a fourth elastic beam 39.

The anchor structure further includes a ninth anchor point 34 and a tenth anchor point 35, the ninth anchor point 34 is set on the side of the third weight 9 away from the fourth weight 10, the third weight 9 is connected with the ninth anchor point 34 through a fifth elastic beam 40. The tenth anchor point 35 is set on the side of the fourth weight 10 away from the third weight 9, and the fourth weight 10 is connected to the tenth anchor point 35 through a fifth elastic beam 40.

The first unit 2 further includes a first fixed component 36 which is arranged between the first weight 7 and the second weight 8 and is connected to the first weight 7 and/or the second weight 8 and is fixed to the substrate 1. second unit 3 further includes a second fixed component 37 disposed between the third weight 9 and the fourth weight 10, connected to the third weight 9 and/or the fourth weight 10 and fixed to the substrate 1.

In some embodiments, when the gyroscope is in the driving mode, the first weight 7 and the second weight 8 move in the X Axis direction and approach each other, and the third weight 9 and the fourth weight 10 move in the X axis direction and move away from each other. Thus, the first coupling structure 11 is driven to rotate counterclockwise with the first anchor point 26 as the center. The second coupling structure 12 rotates clockwise around the second anchor point 27, and the third coupling structure 13 rotates counterclockwise around the third anchor point 28. The fourth coupling structure 14 rotates clockwise with the fourth anchor point 29 as the center, the fifth coupling structure 15 rotates counterclockwise with the fifth anchor point 30 as the center, and the sixth coupling structure 16 rotates clockwise with the sixth anchor point 31 as the center.

When the gyroscope is in the detection mode, the first weight 7, second weight 8, third weight 9 and fourth weight 10 swing with Y axis direction as the axis. In some embodiments, the outer side of first weight 7 swings toward −Z axle, the outer side of second weight 8 swings toward +Z axle, the outer side of third weight 9 swings toward +Z axle, and the outer side of fourth weight 10 swings toward −Z axle.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS gyroscope, comprising:
    a substrate;
    a first unit and a second unit arranged on the substrate along a first direction; the first unit being connected with the second unit through a coupling spring;
    a driving electrode and a plurality of detection electrodes formed on the substrate, wherein:
    the first unit includes a first weight and a second weight arranged along a second direction perpendicular to the first direction; the second unit includes a third weight and a fourth weight disposed oppositely along the second direction;
    and wherein the MEMS gyroscope further includes a first set of coupling structures disposed on opposite sides of the first weight and the second weight along the second direction; the first set of coupling structures is connected with the first weight and the second weight through a first set of elastic beams; and
    the MEMS gyroscope further includes a second set of coupling structures disposed on opposite sides of the third weight and the fourth weight along the second direction; the second set of coupling structures is connected with the third weight and the fourth weight through a second set of elastic beams; the coupling structures in the first set of coupling structures and the second set of coupling structures opposite along the first direction are connected by the coupling spring.

2. The MEMS gyroscope as described in claim 1, wherein, the first set of coupling structures includes a first coupling structure arranged on the side of the first weight away from the second weight, a second coupling structure arranged between the first weight and the second weight; the third coupling structure on the side of the second weight away from the first weight;
    the first coupling structure, the second coupling structure and the third coupling structure are connected with the first weight and/or the second weight through the first set of elastic beams; and
    the second set of coupling structures includes a fourth coupling structure disposed on the side of the third weight away from the fourth weight, a fifth coupling structure disposed between the third weight and the fourth weight, a sixth coupling structure on the side of the fourth weight away from the third weight; the fourth coupling structure, the fifth coupling structure and the sixth coupling structure are connected with the third weight and/or the fourth weight through the second set of elastic beams; the first coupling structure and the fourth coupling structure, the second coupling structure and the fifth coupling structure, and the third coupling structure and the sixth coupling structure are all connected by the coupling spring.

3. The MEMS gyroscope as described in claim 1, wherein the driving electrode is arranged between the first unit and the second unit, the inner sides of the first weight, the second weight, the third weight, and the fourth weight are all provided with active driving interdigital; the active driving interdigital and the fixed driving interdigital on the driving electrode form a driving capacitor.

4. The MEMS gyroscope as described in claim 3, wherein the plurality of detection electrodes correspond to the outer sides of the first unit and the second unit along the first direction, is respectively engaged with the first weight, the second weight, the third weight, and the fourth weight for forming a detection capacitor.

5. The MEMS gyroscope as described in claim 2 further including several anchor structures fixed on the substrate, a first slot through the first coupling structure, a second slot through the second coupling structure, and a third slot through the third coupling structure, wherein the anchor structure includes a first anchor point, a second anchor point and a third anchor point respectively set in the first slot, the second slot and the third slot; the MEMS gyroscope is fixed on the substrate through the first anchor point, the second anchor point and the third anchor point;
    and wherein the MEMS gyroscope further includes a fourth slot through the fourth coupling structure, a fifth slot through the fifth coupling structure, and a sixth slot through the sixth coupling structure; the plurality of anchor structures further include a fourth anchor point, a fifth anchor point and a sixth anchor point respectively set in the fourth slot, the fifth slot and the sixth slot; the second unit of the MEMS gyroscope is fixed to the substrate through the fourth anchor point, the fifth anchor point and the sixth anchor point.

6. The MEMS gyroscope as described in claim 5, wherein the several anchor structures are respectively connected to the coupling structure where they are located through at least one third elastic beam.

7. The MEMS gyroscope as described in claim 6, wherein the anchor structure further includes a seventh anchor point arranged on the side of the first weight away from the second weight and fixed on the substrate, an eighth anchor point arranged on the side of the second weight away from the first weight and fixed on the substrate; the seventh anchor point and the eighth anchor point are respectively connected to the first weight or the second weight through a fourth elastic beam.

8. The MEMS gyroscope as described in claim 6, wherein the anchor structure further includes a ninth anchor point arranged on the side of the third weight away from the fourth weight and fixed on the substrate, a tenth anchor point arranged on the side of the fourth weight away from the third weight and fixed on the substrate; the ninth anchor point and the tenth anchor point are respectively connected with the third weight or the fourth weight through a fifth elastic beam.

9. The MEMS gyroscope as described in claim 1, wherein the first unit further includes a first fixed component connected to the first weight and/or the second weight and fixed to the substrate, which is provided between the first weight and the second weight; the second unit further includes a second fixed component connected to the third weight and/or the fourth weight and fixed to the substrate, which is provided between the third weight and the fourth weight.

10. The MEMS gyroscope as described in claim 1, wherein the MEMS gyroscope is a symmetrical structure along the first direction and/or the second direction.

\* \* \* \* \*